United States Patent [19]

Lingart et al.

[11] Patent Number: 5,792,524
[45] Date of Patent: Aug. 11, 1998

[54] DECORATIVE CONSTRUCTION MATERIAL

[75] Inventors: Jury K. Lingart; Nailia A. Tikhonova, both of Praha, Czech Rep.

[73] Assignee: Futuristic Tile L.L.C., Allenton, Wis.

[21] Appl. No.: 686,266

[22] Filed: Jul. 25, 1996

Related U.S. Application Data

[62] Division of Ser. No. 385,563, Feb. 8, 1995, Pat. No. 5,720,835.

[30] Foreign Application Priority Data

Nov. 16, 1994 [CZ] Czech Rep. ............... 2810-94

[51] Int. Cl.⁶ ............... B32B 17/06; E04F 15/02
[52] U.S. Cl. ............... 428/34.4; 428/34.5; 428/319.1; 428/325; 428/428; 428/432; 428/454; 428/721; 428/722; 52/311.1; 52/612
[58] Field of Search ............... 428/428, 701, 428/702, 319.1, 34.4, 34.5, 325, 432, 446, 454; 156/89; 264/44, 60, 112, 113; 52/311.1, 315, 311.2, 596, 612

[56] References Cited

U.S. PATENT DOCUMENTS

| | | | |
|---|---|---|---|
| 1,185,555 | 5/1916 | Thomas | 264/644 |
| 1,341,979 | 6/1920 | Grönroos | 65/17.3 |
| 3,546,061 | 12/1970 | Kraemer et al. | 428/312.6 |
| 3,883,337 | 5/1975 | Helgesson et al. | 65/31 |
| 3,963,503 | 6/1976 | Mackenzie | 501/39 |
| 4,054,435 | 10/1977 | Sakane et al. | 65/17.5 |
| 4,173,609 | 11/1979 | Engström | 264/43 |
| 4,187,266 | 2/1980 | Greskovich et al. | 264/43 |
| 4,276,331 | 6/1981 | Bothwell | 428/34.6 |
| 4,313,900 | 2/1982 | Gonzales, Jr. et al. | 264/642 |
| 4,514,456 | 4/1985 | Deal et al. | 428/204 |
| 4,818,731 | 4/1989 | Mizutani et al. | 501/17 |
| 4,833,015 | 5/1989 | Furuuchi et al. | 428/309.9 |
| 5,080,959 | 1/1992 | Tanaka et al. | 428/212 |
| 5,106,789 | 4/1992 | Lesher et al. | 501/89 |
| 5,296,180 | 3/1994 | Hayes et al. | 264/44 |
| 5,350,004 | 9/1994 | Rocazella et al. | 164/97 |
| 5,425,909 | 6/1995 | Fu et al. | 264/44 |
| 5,431,996 | 7/1995 | Giesemann | 428/288 |
| 5,437,902 | 8/1995 | Itoh | 428/68 |
| 5,445,772 | 8/1995 | Uchida et al. | 264/35 |
| 5,536,345 | 7/1996 | Lingart | 156/89 |
| 5,649,987 | 7/1997 | Greulich | 65/17.5 |

FOREIGN PATENT DOCUMENTS

| | | |
|---|---|---|
| 41 25 698 C 1 | 11/1992 | Germany. |
| 43 19 808 C 1 | 7/1994 | Germany. |
| 546569 | 2/1977 | Russian Federation. |

*Primary Examiner*—Rena Dye
*Attorney, Agent, or Firm*—Foley & Lardner

[57] ABSTRACT

A decorative construction material such as a glass tile is produced from recycled glass granulate, and exhibits a smooth, external surface substantially free from defects on one side of the tile. One or two layer tiles may be produced. A binder, together with control of the maximum temperature and temperature gradient in the layers, if applicable, is used during manufacture to ensure a substantially flawless outer surface.

39 Claims, 1 Drawing Sheet

5,792,524

1
DECORATIVE CONSTRUCTION MATERIAL

This is a divisional of application Ser. No. 08/358,563 filed on Feb. 8, 1995 now U.S. Pat. No. 5,720,835.

FIELD OF THE INVENTION

The invention pertains generally to the field of decorative construction material, and particularly to decorative construction material for internal and external tiling of buildings, industrial and residential areas, health facilities, etc., and methods of its production.

BACKGROUND OF THE INVENTION

The internal and external tiling of buildings, industrial and residential areas, health facilities, etc., is commonly made of natural and artificial construction materials, the most used materials being marble and granite, as well as ceramic tiles of various kind. In addition to being decorative, the construction materials used should be functional, exhibiting the following characteristics: long durability, resistance to weather effects; resistance to corrosion; inert behavior to chemicals; thermal insulation properties; resistance to abrasion; and, at the same time it should also be economical in both production and installation costs.

It is known that no natural or ceramic material meets all the aforementioned requirements. Additionally, during production of natural stone plates or tiles of larger dimensions, non-homogeneity of structure has been exhibited, and cavities in, and porousness of starting material have been found.

Although several previous patent applications in various countries have disclosed the manufacture of construction materials from glass, none of the described processes describes the creation of a tile from such materials with a face that is substantially free from imperfections. See, German Patent Application No. DE 41 25 698 issued to Bass et al.; German Patent Application No. DE 43 19 808, issued to Lingart; and Russian Patent No. 546569, assigned to Glavmospromstroimat.

To provide for such a defect free surface on the construction material produced, it is essential to maintain a selected viscosity in the upper (second) layer of the tile throughout thermal treatment to avoid air bubbles from forming and moving through the material and hardening on the surface of the finished product. Additional steps should be taken to minimize movement of air bubbles being generated during thermal treatment from the lower regions to the face of the finished product. Further, prior disclosures do not permit the production of construction tiling material of another shape than plates, e.g. of a shape of a cylinder. The procedures previously disclosed also do not permit simultaneous production of decorative and construction material, which may be also used as an independent construction element.

SUMMARY OF THE INVENTION

In accordance with the invention, a decorative construction material, and method of making such material are provided.

In one embodiment of the present invention, a multi-layer construction tile whose face is substantially free from defect, is formed by placing several distinct layers of starting material in a mold of a chosen shape, with a binding material placed between at least two of the layers of starting material as well as inside either one or both of them in order to ensure a smooth surface in the final product. The mold and material is then subjected to thermal treatment, wherein the maximum temperature is the Littleton Temperature, plus 30° C. to 80° C., for a given material used in the starting layers, in order to prevent overheating of the material. By carefully preventing overheating of the materials during thermal treatment in the tile formation, the viscosity of the material is maintained at a sufficiently high level throughout thermal treatment so as to prevent excess bubble formation and movement, leading to a smooth surfaced final product.

In another embodiment of the present invention, the starting material is originally placed and compacted in a mold. The compacted material is then subsequently subjected to thermal treatment.

In a further embodiment of the present invention, the properties of the finished tile may be altered by the addition of various components to the starting material prior to thermal treatment. A construction material exhibiting high thermal insulation properties is described, wherein easily combustible materials, including wood sawdust, are added to the starting material. Also, a decorative construction material with a transparent surface may be created by utilizing transparent glass particles as the starting material. The addition of metal materials or templates to the outer surface of the upper layer prior to thermal treatment may be used to form contours on the finished tile. A construction material suitable for use as flooring material for garages, repair shops and other situations wherein adsorption of spilled fuel, oil, etc. is required may be prepared by utilizing a combination of glass particles and slag as the starting material.

In another embodiment, the present invention is a nonskid tile and method for making the same.

In a further embodiment, the invention discloses a tile having a higher strength than previously disclosed tiles.

In yet another embodiment, the process of forming facing surfaces applied on the existing construction materials which are used as the first, or supporting layer, such as bricks, cement block, etc. is depicted. This process is used for achieving both the decorative effect and protective properties of the latter.

In a still further embodiment, the present invention describes a cylindrical shaped tile material and method for producing same. In another embodiment, the present invention discloses a construction product having a mirrored face, and a method for producing such a product.

In another embodiment, the present invention is drawn to a construction tile having either a concave or convex face.

DETAILED DESCRIPTION OF THE INVENTION

Figure 1:
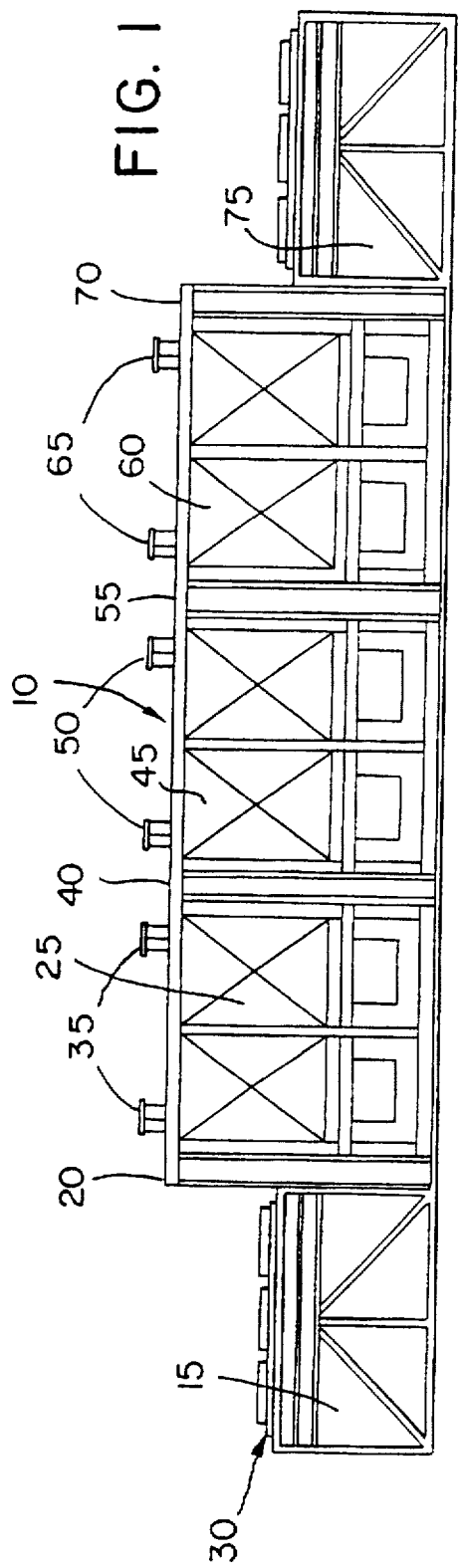
FIG. 1 illustrates a cross section view of an automated kiln oven used for producing tiles according to the present invention.

The subject of the invention is the decorative construction material, applicable, for example, for internal and external tiling of buildings, industrial and residential areas, health facilities, which according one embodiment of the invention consists of a lower (first) layer made of a sintered mixture containing one or more of the following: slag, sand, aluminum oxide, and glass granulate and additionally containing a binder such as liquid sodium silicate, and the upper (second) layer made of sintered glass granulate and/or glass granulate.

The purpose of adding a bonding agent is to provide good bonding of the material prior to thermal treatment and its high strength after the thermal treatment. It was also surprisingly and unexpectedly discovered by the inventors that the addition of a bonding agent such as sodium silicate (water glass) prior to thermal treatment helped to eliminate bubbles of gas from forming in the lower layer and rising into the top layer, resulting in a surface that is substantially free from defects usually caused by gas bubbles escaping from the top layer.

Additionally, the inventors have surprisingly and unexpectedly discovered that by limiting the maximum temperature during thermal treatment of the materials to 30° C. to 80° C. above the Littleton Temperature for the glass granulate for the first and second layer of glass granulate, it was possible to maintain a high viscosity of the materials throughout formation of the construction product. This high viscosity is required to avoid gas bubbles forming in the materials from rising through the materials to the outer surface of the second layer, which would result in a marred finish in the final product. The term "Littleton Temperature" is herein defined as the Littleton softening point temperature for a given glass. The Littleton softening point temperature is the temperature at which a specified glass has the viscosity of $10^{7.65}$ poise. See, J. Stanek, *Electric Melting of Glass*, Elsevier Scientific Publishing Co., pp. 76,80 (1977). Further, by operating at a temperature in the range of the Littleton Temperature for a given glass, the overall operating temperature is reduced from temperatures used in previous disclosures utilizing glass starting materials, thereby requiring less energy and lowering the cost of production.

The purpose of addition of aluminium oxide is its effect on a change of glass viscosity. In a temperature range of 1200° to 1400° C. it increases glass viscosity. However, the inventors have found that, surprisingly and unexpectedly, in temperatures ranging from 800°–1000° C., i.e. in the temperature range mostly used for thermal treatment of the product in the current invention, it reduces the viscosity of the glass.

The decorative construction material according to the invention may be shaped to a plate or a cylinder. The plate may have a flat, convex or concave surface.

The subject of the invention is further the method of production of the decorative construction material, in which, according to the invention, a lower layer is laid of a mixture of sand or slag and/or fine grained $Al_2O_3$ and/or glass granulate, containing up to 25 weight percent of sand, up to 40 weight percent of slag, up to 7 weight percent of aluminium oxide, 2–8 weight percent of bonding agent, preferably water glass in solution or solid, into a heat resistant mold made of a material with the same or smaller coefficient of thermal expansivity than that of glass granulate used, the inner surface of the mold is as the case may be ground and covered with a fluid solution of kaolin, and the bonding agent is uniformly distributed along the whole volume so that a good bonding is provided of all components of the mixture. Kaolin will not sinter during following thermal treatment and facilitates removal of the final product out of the mold. Both layers shall be arranged to a required thickness of the final product, however, either layer should not be thinner than double the diameter of sand particles, pieces of slag or glass granulate used. After laying the first layer, the second layer is laid of color glass granulate and, the thermal treatment is carried out, at minimum temperatures for treatment being in the range as follows: heating and a pause at the Littleton Temperature for given glass plus 30° to 80° C. with temperature gradient in both layers not higher than $T_{max}$, when the Littleton Temperature is achieved on the external surface of the first layer, further in cooling with a speed of 10°–30° C./min a total of 100°–150° C., and subsequent cooling to ambient temperature.

When selecting the value of a temperature gradient, it is necessary to take also in consideration the fact that air bubbles are formed in the volume of the sintered glass granulate, which have a tendency to reach the surface by the effect of a force pushing them upward. The forming force pushing the bubbles depends on the bubble size and the temperature gradient. The dimensions of the bubbles are minimized in the stage of preliminary pressing of the starting charge, the composition of which contains water glass, which during compacting fills free pores between the granules. The value of the temperature gradient is selected so that forming force pushing the bubbles upward would be smaller for microbubbles than the forces of viscous friction to prevent the microbubbles from emerging. Therefore, the inventors have surprisingly and unexpectedly discovered that by limiting the temperature gradient between the first and second layers to $T_{max}/25$, air bubbles formed in the lower layer are prevented from rising to the surface of the tile during thermal treatment and thereby marring the finished tile surface.

At the temperature corresponding to the Littleton Temperature (which is in the range of 830° to 940° C. for most types of glass) the glass mass spills onto the surface due to its own weight.

Prior to annealing of the final product the temperature distribution in the volume of the product should be equalized, while temperature decrease in the zone of the temperature of transformation ($T_g-30°$ C. to $T_g+30°$ C.) shall be carried out with the speed not greater than 3° C. $min^{-1}$ while observing the condition of a linear course of cooling in time.

To obtain a construction material showing high thermal insulation properties, up to 40 weight percent are added of easily combustible material, as e.g. wood sawdust, to the starting raw material for the first layer, of the same particle size as the basic components of the mixture, and in the stage of heating at the temperature of combustion of this material such a temperature shall be maintained until all gas forming substances are fully released. The term "easily combustible material" is herein defined as a material having an inflammation point not higher than $\frac{2}{3} T_{max}$. The term "$T_{max}$" is herein defined as the maximum temperature reached during thermal treatment in production of the construction material. Then the upper layer of colored glass granulate shall be evenly poured on the surface and the thermal treatment takes place as described above. The addition of easily combustible material and its turning to gas would form a porous structure with the low coefficient of thermal conductivity of the second layer. This layer is fixed in the next thermal treatment.

To obtain a construction material with finely wrinkled anti-skid surface the pause shall be maintained during the thermal treatment exactly at the Littleton Temperature of the glass granulate of the second layer for a period necessary for forming microwrinkles on the surface of in advance determined degree, but in any case sufficient enough for melting the granules and filling the pores and orifices on the surface of the first layer. The duration of the pause depends on glass used, or on its Littleton Temperature.

To produce a material suitable for floors of garages, repair shops, etc., which makes possible good adhesion of car tires with the surface and good soaking in of fuel when incidentally spilled on the floor surface, the starting mixture shall be prepared from slag with addition of 30 to 50 weight percent of glass granulate with particle size of 5–10 mm. The mixture shall be evenly poured into a thermally stable mold in a thickness of 10 to 30 mm, and then it is thermally treated without preliminary pressing under the conditions of the temperature gradient in the layer thickness not more than $T_{max}/25$, with $T_{max}$ being determined as the Littleton Temperature of the glass granulate added.

To obtain a decorative construction material with transparent decorative surface and light conducting properties, which makes possible forming of lighting walls and floors, the first layer shall be formed of two parts and the second layer shall be formed from transparent glass granulate, and linear light sources are arranged on the side surface of the material and the total thickness of both parts of the first layer is preferably not thicker than half the total thickness of the tile. The side surface, where the light source is located, may be mechanically polished.

To reinforce the second layer, which in usage will be the surface decorative layer, and to obtain the properties of toughened glass by creation of a stress in the second layer during the thermal treatment after a stage of rapid cooling, the toughening of the product shall be carried out by means of a water fog and/or by pressurized air blown through a levelling grid, and the initial, toughening temperature shall equal $T_g+40°-70°$ C., where $T_g$ is the international designation used for the transformation temperature, in which the irreversible changes occur in the glass structure, e.g. crystallization begins. At this temperature, viscosity of glass granulate of the second layer is $10^{12.5}$ Pa s. The water fog provides high and stable in time heat transfer coefficient from the tile surface to the ambient.

It is known that the highest strength is exhibited by the materials with modified internal structure, especially in cases when this structure has the shapes close to a cube geometry. To obtain a regular volume structure of the regular layer, which permits production of tiles with increased mechanical strength, at least one and a maximum of 20 layers of a fabric of glass fibers are embedded into the first layer. The starting charge shall be poured between the layers of the fabric. The distance between the fabric layers should be the same as the dimensions of its cells, which secures creation of internal cubic structure. Further thermal treatment is carried out as described above.

To produce products of a cylinder shape, the formation of the construction material is carried out in a cylindrical mold with ground and/or polished inner surface, with front circular covers with openings, and the mold is placed in a kiln in a horizontal position and rotated with a speed providing even distribution of initial components on the inner surface. The production and thermal treatment is carried out in two stages. In the first stage pouring of the second (decorative) layer of the glass granulate is carried out, followed with heating to the temperature securing even distribution of melted glass on the inner surface of the mold, then cooling, and the first (lower) layer (in this case internal) is poured. During the second stage of the thermal treatment the sintering is carried out at the temperature lower than that of Littleton Temperature for the used glass granulate of the decorative layer, followed with cooling with described phases of annealing and toughening.

To obtain products with high strength properties and a flat mounting surface, the thermal treatment is carried out in the molds made of a material with the same or smaller coefficient of thermal expansivity than that of used glass granulate, their surface may be ground and/or polished and preferably covered with a fluid solution of kaolin.

The decorative surface may be also applied to the construction products, as e.g. on bricks, cement plates, asbestos-cement plates, etc. The first layer is directly disposed on the construction product, herein defined as the supporting plate. Formation of the decorative surface on the supporting plate is carried out by coating the supporting plate with two layers. The first layer is made of a mixture of finely ground sand and glass granulate of a thickness of a maximum of 0.5 mm. The second layer is formed of color glass granulate of a thickness of 2–4 mm. After coating the two layers the thermal treatment is carried out with the temperature shock at the temperature not exceeding the Littleton Temperature by 30° to 80° C. for a period necessary to form the decorative surface of required appearance.

To obtain a material thermally treated in a kiln without need of using a mold, the first layer is poured into a mold which can be taken apart, the material is pressed, the second layer is levelled on top of the first layer, pressed, dried and prior to putting into a kiln it is removed out of the mold.

To produce the tailor made patterns of decoration, the decoration elements (templates) and/or metal materials possessing similar coefficient of thermal expansivity as that of the glass granulate used, are used to form contours of the decoration and which are melted into the second layer during thermal treatment of the plate.

Initial charge may be modified using a press employing a curved mold, with a radius of curvature being selected so that the forces of viscous friction in the second layer prevail over the tendency of glass to flow down to prevail over the primary working or "pull" flow. The radius of curvature shall be determined by the value of temperature elevation above the Littleton Temperature so that during the period, when the maximum temperature of the thermal treatment is in effect, the arising deformation force in the surface layer is lower than the forces of viscous friction for maintaining the even thickness of the decorative layer.

If the addition of glass granulate is used, the components of which exhibit different coefficients of thermal expansivity, the oxides of metals are added to the initial mixture in a form of a fine powder. The following rule shall be applied: to increase the coefficient of thermal expansivity the oxides of sodium, lithium or potassium in amounts of 0.1 to 10 weight per cent are used. If it is necessary to decrease the coefficient of thermal expansivity, the oxides of magnesium, calcium or barium are added, always in the amounts of 0.1 to 10 weight per cent. These materials are added so as to keep the coefficients of linear expansion of both the first and second layer as close to each other as possible. The inventors have found that surprisingly and unexpectedly, by minimizing difference in the coefficient of linear expansion of each layer, it is possible to avoid cracks from forming in the product during cooling and annealing.

The decorative construction materials produced according to the invention are similar to the natural materials, however, they may differ from these; they are resistant to the effects of surrounding environment, resistant to weather and chemical effects, they exhibit high strength and are made of cheap and available raw materials. The production is carried out in the environmental friendly production process. The invention makes possible to produce the decorative surface also on the common construction materials, as e. g. cement or asbestos-cement plates, bricks, etc.

The invention may also be used to create a construction material with only a single layer. A single layer of glass granulate together with 3–4% (by wt.) of sodium silicate solution as a bonding agent is placed in a heat resistant mold and levelled without preliminary packing. The mold and single layer are subjected to thermal treatment such that the material within the mold reached the temperature corresponding to the glass granulate viscosity level equal to $10^{12.5}$–$10^{13}$ Pa s. This temperature is then maintained until that temperature is reached throughout the entire material. The material is then subjected to thermal shock by raising the temperature of the outer surface of the material to 30°–70° C. above the Littleton Temperature. Further thermal treatment is then carried out as previously described to yield a single layer construction material.

The above described technology can be applied using electric kilns with defined regime of heating and cooling, or in continuous heating kilns.

The invention is further described in the following non-limiting examples.

EXAMPLE 1

On the inside of a fireproof mold made of cordierite, a fluid suspension of kaolin was applied and dried so that on the bottom and side walls of the mold, a smooth layer of white kaolin was formed. The charge was then packed in the mold with a first layer consisting of a mixture containing 20 weight percent of sand of a particle diameter of up to 3 mm, 35 weight percent of slag of a particle diameter of up to 4 mm, 42 weight percent of glass granulate of a particle diameter of 2–3 mm, bonded by stirring with 3 weight percent of water glass. The first layer was poured to a thickness of 8 mm and then leveled and compacted with the use of a vibration press.

The first layer was covered with the second layer of colored glass granulate of a thickness of 4 mm and then leveled and compacted with the use of a vibration press. Then the filled mold was placed on a metal pallet and placed on loading table 15 of oven assembly 10 as illustrated in FIG. 1. Alternatively, the molds may be filled, leveled and compressed directly on loading table 15.

Figure 2:
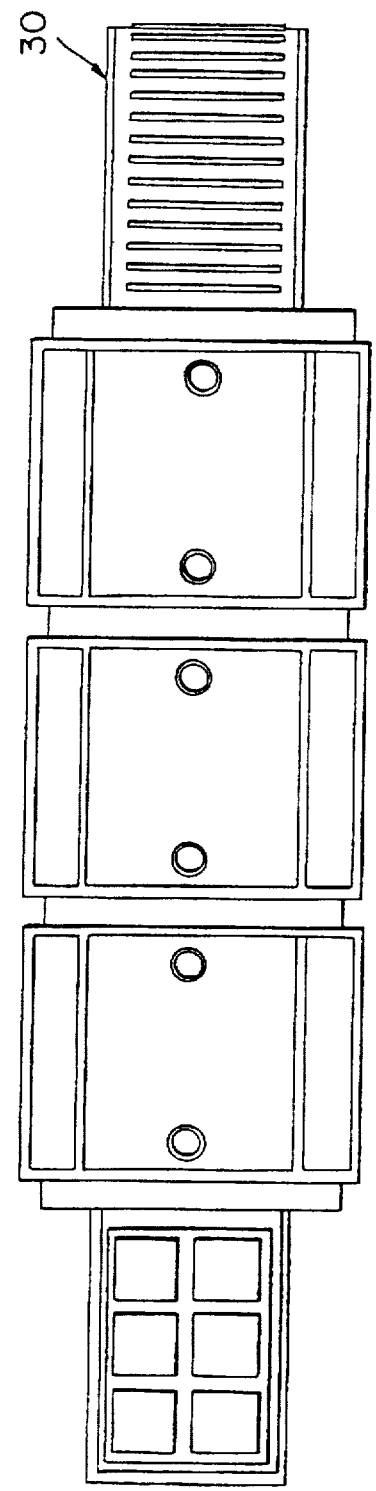
FIG. 2 is a top view of the automated kiln oven shown in FIG. 1.

With reference to FIGS. 1 and 2, entry door 20 of heating chamber 25 was then opened and the pallet containing the mold moved into heating chamber 25 by roller means 30, which runs the length of oven assembly 10. Heating chamber 25 contains a heating means typical to those known in the art which is not illustrated. The temperature of heating chamber 25 was initially 600° C. After the pallet entered heating chamber 25, entry door 20 was closed and the temperature raised to a maximum temperature. The maximum temperature is 30°–80° C. above the Littleton Temperature of the glass granulate used. This temperature is typically within the range of 800°–950° C. The extent of the temperature gradient of both of the layers was $T_{max}10^{-1}$. By maintaining this narrow temperature gradient throughout the layers, assurance that the layers maintain adequate strength without danger of cracking was provided. This maximum temperature was maintained for 10 to 15 minutes.

Next, the heating element of heating chamber 25 was shut off, and cool air circulated through heating chamber 25 by means of cooling pipes 35, until the surface temperature of the outer surface of the second layer had been reduced by approximately 150°–200° C.

This temperature reduction occurs as follows. After the pause at the maximum temperature, the surface temperature of the second layer was dramatically reduced with a speed of 10°–30° C. min$^{-1}$ by 150° C., by which the formed tile structures are fixed. This cooling was necessary to fix the tile surface and prevent gas bubbles from appearing on the outer surface of the second layer. This cooling reduced the temperature inside of heating chamber 25 to the original 600° C.

After this cooling period, annealing chamber door 40 was opened and the pallet and tile were transported by roller means 30 into annealing chamber 45. annealing chamber door 40 was then closed, and entry door 20 opened and a second pallet containing filled molds was loaded into heating chamber 25 by rolling means 30. In this manner, a continuous production of tiles according to the current invention was affected. The mold and pallet filling, heating and cooling temperatures, roller means, and doors may all be controlled by computer, in order to automate the process.

Then annealing of the tiles was carried out in annealing chamber 45, the chamber 45 being cooled with air being circulated by means of cooling pipes 50. The cooling in the zone of transformation $T_g+30°$ to $T_g-20°$ C. was carried out with a linear speed of below 3° C./min, until a temperature of approximately 400° C. was reached, approximately 1 hour after the tiles entered the annealing chamber.

Finishing chamber door 55 was then opened, and the pallet and mold containing the tile was transported by roller means 30 into finishing chamber 60. Finishing chamber door 55 was then closed, and cooling chamber door 40 and entry door 20 were opened and closed appropriately allowing roller means 30 to transport successive molds placed on pallets into the appropriate chambers. The tiles within finishing chamber 55 were then cooled to approximately 70°–80° C. over a period of about 1 hour, by circulated air directed inside the chamber and supplied by finishing pipes 65. Exit door 70 was then opened, and the finished tile within the mold is moved to unloading table 75 by roller means 30. The finished product is taken out of the mold and formatted. Because kaolin does not sinter at the temperature used, no difficulties were encountered in removal of the product from the mold.

EXAMPLE 2

On the inside of a fireproof mold made of cordierite a fluid suspension of kaolin was applied and dried so that on the bottom and side walls a smooth layer of white kaolin was formed. The mold was then packed with a mixture containing 25 weight percent of sand, 35 weight percent of slag, 36 weight percent of glass granulate bonded by stirring with 4 weight percent of water glass to form a first layer. The first layer had a thickness of 6 mm and was levelled. The even first layer was then covered with the second layer of colored glass granulate of a thickness of 14 mm. Then the mold was heated until the temperature was 950° C., which was 70° C. higher than the corresponding Littleton Temperature for used charge, for a period until the uniform thermal field over the whole product was achieved. Then a pause of duration of 12 minutes followed. The extent of the temperature gradient of the first and the second layers was $T_{max}/10$. After the pause the surface temperature was dramatically reduced by 100° C., by which the formed structures were fixed. Then rapid toughening was carried out by 100° C. by blowing of a water fog through the levelling grid. It resulted in a surface hardness of 4–6 times higher then that in the procedure without toughening.

EXAMPLE 3

The fireproof mold as packed with the first layer similarly as in the Example 1, with the difference that 30 weight percent (related to the weight of the first layer) of wood sawdust was added to the first layer. The first layer was then subjected to an initial thermal treatment without the addition of the second layer. When the temperature reached the combustion point of sawdust during thermal treatment, this temperature was maintained for ten minutes, which was sufficient to release gas producing components, which passed through the outer surface of the layer. The second layer of colored glass granulate was then disposed on the first layer as specified in Example 1, and the following thermal treatment carried out as in Example 1.

EXAMPLES 4

The fireproof mold of a composition as in Example 1 was used, but of a cylindrical shape. It was packed with colored glass granulate in the amount sufficient for forming the external surface (commonly referred to as the second layer throughout the disclosure) of the resulting cylinder product of a thickness of 2–3 mm. Then the mold was placed horizontally into a kiln and was rotated with 50–70 revolutions per minute. The external surface of the mold was uniformly heated to 880° C., when the second layer evenly spills over the inner surface of the mold. Then the temperature was decreased by 150°–300° C., the first layer was poured into the mold by front openings and it was heated to the Littleton Temperature of the glass granulate used in this Example. By limiting the maximum temperature to the Littleton Temperature, penetration of infusible particles from the first layer through the second layer to outer surface of the product was prevented. Further thermal treatment was the same as in Example 1. The glass granulate used had the coefficient of thermal expansivity 9.05 $10_{-6}$ mm/1° K, the mold used had a coefficient of thermal expansivity of 20% less than that of the glass granulate used, which ensured that the product will not crack during cooling.

EXAMPLE 5

This Example describes coating the invention on a brick as a representative of materials which may be coated by the invention. The mixture according to Example 1 was used as a charge, but with the diameter of particles used within the range of up to 0.2 mm. It secured penetration of the charge into the brick surface and thus a good bond of the brick with the surface decorative layer. The process according to Example 1 was then carried out, i.e. on this first layer was then poured a second layer of color glass granulate and the thermal treatment was carried out.

EXAMPLE 6

A metal mold with sides, which could be taken apart, was covered with a fluid suspension of kaolin and then dried so that on the bottom and side walls a smooth layer of white kaolin was formed. It was then packed with a mixture containing 20 weight percent of sand, 20 weight percent of slag, 8 weight percent of aluminium oxide, and 45 weight percent of glass granulate of a size, which passed through a screen with the mesh diameter of 2 mm, into which water glass was added as a bonding agent in amount of 7 weight percent and carefully stirred. The poured layer was levelled and compacted to the final thickness of 9 mm. Then color glass granulate soaked with the same bonding agent in amount of 6 weight percent was poured, levelled and also compacted. Then the prepared mixture in the mold was dried at 300° C. for 1 hour, the semi-manufactured product was removed out of the mold and was subjected to the thermal treatment as in Example 1.

EXAMPLE 7

The example depicts the production of transparent decorative boards and walls. For the second layer a transparent glass granulate was used, or with various shades, and the thickness of this layer was 4 mm and formed one third of the total product thickness. The first layer was formed of 23 weight percent of colored sand, 72 weight percent of colored glass granulate, and 5 weight percent of dropped water glass.

The first and second layers were poured and thermally treated as in Example 1 and after cooling and removal from the mold the edges of each tile which are in contact with the edges of other tiles after the individual tiles are fixed were then ground.

EXAMPLE 8

A construction material was formed according to Example 7 with the difference being that the first layer was formed of 15 weight percent of sand, 83 weight percent of glass granulate and 2 weight percent of dropped water glass.

EXAMPLE 9

The decorative materials with anti-skid surface was prepared according to Example 1 with the difference that the surface temperature during thermal treatment was kept at the Littleton Temperature of the glass granulate used in the upper layer. This temperature was maintained for the period sufficient for penetration of melting glass granules into pores on the product surface, which in the given example was 14 minutes. This provides an uneven surface with projections, corresponding with their dimensions to the size of used glass granules.

EXAMPLE 10

A construction material with an increased strength was obtained by embedding three layers of glass fiber fabric into the first layer with a fabric coarseness (mesh dimensions) close to the dimensions of glass granules and other components. The composition of the layers is as in Example 1, and production of the material was done according to Example 1.

EXAMPLE 11

To further increase the strength of the construction material, the process of Example 10 was carried out, with the difference that there were six layers of glass fiber fabric embedded into the first layer.

EXAMPLE 12

To achieve a significant surface effect, proceed as in Example 1, with the difference that there were embedded metal wires in the amount of 4 weight percent of the layer composition into the second layer so that they are laid down on the first layer and the second layer of color glass granulate was arranged around the decorative elements so that they were separated in colors. The product exhibited an impression of a multicolor drawing.

EXAMPLE 13

A construction material suitable for covering floors of garages due to its high adhesion to car tires was prepared. The starting mixture, as in Example 1, consisted of 40 weight percent of slag, 22 weight percent of sand, 7 weight percent of aluminium oxide, and 8 weight percent of bonding agent—dropped water glass. Remaining 24 weight percent was formed of glass granulate. The particle size of used raw materials, except the aluminum oxide, was 3–5 mm, the aluminium oxide was fine grained. The mixture was then thoroughly mixed, poured into a mold, and it was arranged in a layer of a uniform thickness. Then thermal treatment was carried out during which a temperature gradient was not higher than $T_{max} \times 25^{-1}$. The maximum surface temperature was 860° C., which corresponds to the Littleton Temperature of the glass granulate used. Under these conditions a sintering of the material was provided throughout its volume, and the porous structure was maintained due to a high slag content. Thus produce material bonds with lubricants and adheres to car tires.

EXAMPLE 14

A construction material was produced, with the finished product having a curved surface. The method was carried out as in Example 1, and the pushing surface of the press used for compacting of the second layer of the mixture was curved—concave, and it should be taken into consideration when determining the radius of curvature that the material at the softening temperature achieved during thermal treatment will have a tendency to level. The temperature was used, which still provided softening of the surface, but did not permit its spilling into a plane. The temperature of 800° C. was used with a pause of 5 minutes at this temperature, which corresponds to the principle of a maximum temperature for a minimum time.

EXAMPLE 15

A construction material was produced as in Example 14 with the difference that the pushing surface of the press used for compacting the material prior to thermal treatment was convex.

EXAMPLE 16

This example shows production of tiles from metallurgical waste products. It was achieved by removal of air out of the material prior to thermal treatment and by removal of gases formed during thermal treatment. A vacuum kiln was used for heating the material. The process of heating was carried out in vacuum corresponding to $10^{-2}$ mm Hg. The resulting product was free of gas and its surface is not damaged by escaping gas. Temperature of thermal treatment was selected so that it corresponds to about $10^4$ Pa s for either the glass granulate or metallurgical waste products used.

EXAMPLE 17

The inside of a fireproof mold made of cordierite was coated with a fluid suspension of kaolin and dried so that on the bottom and side walls a smooth layer of white kaolin was formed. It was then packed with a mixture containing 40 weight percent of sand of a size, which passed through a screen with the mesh diameter of 2 mm, 5 weight percent of slag of a particle size, which passed through a screen with the mesh diameter of 3 mm, 5 weight per cent of fine grained aluminium oxide, 38 weight percent of glass granulate of sodium-potassium glass of a particle size, which passed through a screen with the mesh diameter of 3 mm, 6 weight percent of fine grained magnesium oxide bonded by stirring with 6 weight percent of water glass. Poured layer of a thickness of 11 mm was levelled. The even first layer was then covered with the second layer of color glass granulate with the Littleton Temperature of 850° C., of a thickness of 5 mm and it is also levelled. Then the mold was heated in a uniform thermal field until the temperature achieved was 30° C. higher than the Littleton Temperature, so that the maximum temperature ($T_{max}$) was 880° C. The temperature of 880° C. was maintained for a duration of 8 minutes. The extent of the temperature gradient of the first and second layers was 10% of $T_{max}$. Thus it was achieved that the temperature of the first layer was sufficient for sintering and the layer was strong enough.

After the pause the surface temperature was dramatically reduced with a speed of 20° C. min.$^{-1}$ by 120° C., by which the formed structures are fixed. Then annealing of duration of 9 minutes was carried out followed with cooling. The cooling in the zone of transformation $T_g+30°$ to $T_g-20°$ C. was carried out with a linear speed of 2° C. min$^{-1}$. After the ambient temperature was achieved, the finished product was taken out of the mold and subsequently formatted.

EXAMPLE 18

The inside of a fireproof mold made of cordierite was coated with a fluid suspension of kaolin and was dried so that on the bottom and side walls a smooth layer of white kaolin was formed. It was then packed with a mixture containing 40 weight percent of sand of a particle diameter of up to 3 mm, 5 weight percent of slag of a particle diameter of up to 3 mm, 44 weight percent of glass granulate of a particle diameter of 2–3 mm, 7 weight percent of aluminium oxide, bonded by stirring with 4 weight percent of water glass. This first layer of a thickness of 10 mm was levelled. The levelled first layer was then covered with the second layer consisting of 95 weight percent of color glass granulate of sodium-potassium glass and 5 weight percent of potassium oxide of a thickness of 6 mm and it was also levelled. Then the mold was heated in a uniform thermal field until the whole surface of the plate achieves the maximum temperature, which is 40° C. higher than the Littleton Temperature of the glass granulate, in the given case 870° C. The maximum temperature ($T_{max}$) was maintained for a duration of 11 minutes. The extent of the temperature gradient of the first and second layers was 10% of $T_{max}$. Thus it was achieved that the temperature of the first layer was sufficient for sintering and the layer is strong enough.

After the pause the surface temperature was dramatically reduced by 115° C. with a speed of 15° C. per minute, by which the formed structures were fixed. Then annealing of duration of 14 minutes was carried out followed with cooling. The cooling in the zone of transformation $T_g+30°$ to $T_g-20°$ C. was carried out with a linear speed of below 3° C. min$^{-1g}$.

The given examples do not limit possibilities of further combinations in the layer composition, method of thermal treatment and thickness of products.

EXAMPLE 19

A construction material according to Example 1 was prepared with only a single layer. The mold was prepared as in Example 1, and a single layer of glass granulate together with 3–4% (by wt.) of sodium silicate solution as a bonding agent was placed in the heat resistant mold and levelled without preliminary packing. The glass granulate may consist of a single color of glass or may comprise a multicolored glass granulate mixture. The mold and single layer were then heated to a temperature of approximately 400°–500° C., at which point the viscosity of the glass granulate was $10^{12.5}$–$10^{13}$ Pa s, allowing for rapid moisture evaporation, and release of forming gases, from the material within the mold. This temperature was then maintained until gas generation from the material substantially ended. The upper surface of the material was subjected to thermal shock, resulting in dramatically increased melting of the upper surface and closing and filling in of all openings or "pores" in the surface of the partially formed construction material. The outer surface of the construction material levelled itself by self distribution of the melted material which occurred after the surface of the material reached the temperature corresponding to 30°–80° C. above the Littleton Temperature of the glass granulate used. The thickness of the melted upper surface of the material was approximately 3–5 mm, with the viscosity value of the material sufficient to prevent preclude any remaining microbubbles within the material from rising to the surface and appear on the outer surface of the construction material. The thickness of the melted surface and the extent of levelling (smoothness) of the construction material during formation depend on the duration of time at which the maximum temperature is maintained, usually approximately 3–5 minutes.

It is understood that the invention is not confined to the particular embodiments set forth herein as illustrated, but embraces all such modifications thereof as come within the scope of the following claims.

What is claimed is:

1. A two layer construction material comprising:
   a first layer comprising at least one material selected from the group consisting of sand, slag and glass granulate, and mixtures thereof, together with a bonding agent and aluminum oxide;
   a second layer, having a first surface and a second surface, comprising glass granulate, the first surface disposed on the first layer;
   wherein the first and second layers are thermally treated to sinter the first and second layers such that no significant amount of bubbles or blemishes appear on the second surface of the second layer and the first and second layers are bonded together resulting in a two layer construction material.

2. The construction material of claim 1 wherein the bonding agent of the original component mixture of the first layer prior to thermal treatment is a sodium silicate solution.

3. A two layer construction material comprising:
   a first layer comprising at least one material selected from the group consisting of sand, slag and class granulate, and mixtures thereof, together with a bonding agent, an easily combustible material and aluminum oxide;
   a second layer, having a first surface and a second surface, comprising class granulate, the first surface disposed on the first layer;
   wherein the first and second layers are thermally treated to sinter the first and second layers such that no significant amount of bubbles or blemishes appear on the second surface of the second layer; the first layer containing interstitial spaces resulting from combustion of the easily combustible material in the original component mixture of the first layer.

4. The construction material of claim 3 wherein the easily combustible material is wood sawdust.

5. The construction material of claim 1 wherein the second layer is comprised of clear glass granulate.

6. The construction material of claim 1 wherein the construction material is cylindrically shaped.

7. The construction material of claim 1 wherein the construction material is in the shape of a tile.

8. The construction material of claim 7 wherein the second surface of the second layer is convex.

9. The construction material of claim 7 wherein the second surface of the second layer is concave.

10. The construction material of claim 1 wherein the second layer further includes a bonding agent.

11. The construction material of claim 10 wherein the bonding agent of the original component mixture of the second layer prior to thermal treatment is a sodium silicate solution.

12. The construction material of claim 1 wherein the second surface of the second layer of the construction material is textured.

13. The construction material of claim 1 wherein the first layer further includes at least one sheet of glass fiber fabric.

14. The construction material of claim 13 wherein the first layer includes from one to twenty sheets of glass fiber fabric.

15. The construction material of claim 1 wherein the second layer further includes metal wires embedded in the first layer, and the glass granulate in the second layer further includes several distinct colored glass granulate, the metal wires separating each distinct colored glass granulate from another such that in the second layer a decorative image is formed.

16. The construction material of claim 1 wherein the first layer further includes at least one oxide selected from the group consisting of alkali metal oxides and alkaline-earth metal oxides.

17. The construction material of claim 16 wherein at least one oxide is present in an amount of 0.1 to 10.0 percent of the total weight of the first layer.

18. The construction material of claim 1 wherein the second layer further includes at least one oxide selected from the group consisting of alkali metal oxides and alkaline-earth metal oxides.

19. The construction material of claim 18 wherein at least one oxide is present in an amount of 0.1 to 10.0 percent of the total weight of the second layer.

20. The construction material of claim 1 wherein the first and second layers each further include at least one oxide selected from the group consisting of alkali metal oxides and alkaline-earth metal oxides.

21. The construction material of claim 20 wherein at least one oxide is present in each layer in an amount of 0.1 to 10.0 percent of the total weight of the layer.

22. The construction material of claim 1 wherein the first layer is disposed on a supporting plate.

23. A construction material according to claim 1 wherein the first layer further includes 0% to 40% by weight of slag, 0% to 25% by weight of sand, 0% to 7% by weight of aluminum oxide, approximately 2% to 12% by weight of a liquid sodium silicate solution and the remainder glass granulate.

24. A construction material according to claim 1 wherein the first layer further includes 0% to 40% by weight of slag, 0% to 25% by weight of sand, 0% to 7% by weight of aluminum oxide, approximately 2% to 8% by weight of a liquid sodium silicate solution and 20% to 98% by weight glass granulate.

25. A construction material comprising:
   a first layer consisting essentially of a bonding agent and aluminum oxide together with at least one material selected from the group consisting of slag, glass granulate, and mixtures thereof;
   a second layer, having a first surface and a second surface, comprising glass granulate, the first surface disposed on the first layer;
   wherein the first and second layers are thermally treated to sinter the first and second layers such that no significant amount of bubbles or blemishes appear on the second surface of the second layer and the first and second layers are bonded together resulting in a two layer construction material.

26. The construction material of claim 25 wherein the bonding agent of the original component mixture of the first layer prior to thermal treatment is a sodium silicate solution.

27. The construction material of claim 25 wherein the first layer further consists essentially of an easily combustible material, the first layer containing intersticial spaces resulting from combustion of the easily combustible material in the original component mixture of the first layer.

28. The construction material of claim 27 wherein the easily combustible material is wood sawdust.

29. The construction material of claim 25 wherein the construction material is in the shape of a tile.

30. The construction material of claim 29 wherein the second surface of the second layer is convex.

31. The construction material of claim 29 wherein the second surface of the second layer is concave.

32. The construction material of claim 25 wherein the second layer further comprises a bonding agent.

33. The construction material of claim 32 wherein the bonding agent of the original component mixture of the second layer prior to thermal treatment is a sodium silicate solution.

34. The construction material of claim 25 wherein the second surface of the second layer of the construction material is textured.

35. The construction material of claim 25 wherein the first layer further consists essentially of at least one sheet of glass fiber fabric.

36. The construction material of claim 25 wherein the second layer further comprises metal wires embedded in the first layer, and the glass granulate in the second layer further comprises several distinct colored glass granulate, the metal wires separating each distinct colored glass granulate from another such that in the second layer a decorative image is formed.

37. The construction material of claim 25 wherein the first layer further consists essentially of at least one oxide selected from the group consisting of alkali metal oxides and alkaline-earth metal oxides.

38. The construction material of claim 25 wherein the second layer further comprises at least one oxide selected from the group consisting of alkali metal oxides and alkaline-earth metal oxides.

39. The construction material of claim 37 wherein the second layer further comprises at least one oxide selected from the group consisting of alkali metal oxides and alkaline-earth metal oxides.

* * * * *

UNITED STATES PATENT AND TRADEMARK OFFICE
CERTIFICATE OF CORRECTION

PATENT NO.   : 5,792,524
DATED        : August 11, 1998
INVENTOR(S)  : Lingart, et al.

It is certified that error appears in the above-identified patent and that said Letters Patent is hereby corrected as shown below:

<u>Column 13, Claim 3,</u>
Line 42, and Line 46, in the patent, delete the word "class" before the word "granulate" and insert in its place -- glass --

Signed and Sealed this

Fourth Day of September, 2001

*Attest:*

*Attesting Officer*

NICHOLAS P. GODICI
*Acting Director of the United States Patent and Trademark Office*